United States Patent
Doo et al.

(10) Patent No.: US 9,225,570 B2
(45) Date of Patent: Dec. 29, 2015

(54) METHOD OF ALLOCATING UPSTREAM BANDWIDTH RESOURCE AND METHOD OF TRANSMITTING UPSTREAM DATA IN ORTHOGONAL FREQUENCY DIVISION MULTIPLE ACCESS-OPEN OPTICAL SUBSCRIBER NETWORK

(71) Applicant: Electronics and Telecommunications Research Institute, Daejeon-si (KR)

(72) Inventors: Kyeong-Hwan Doo, Daejeon-si (KR); Hak-Jeon Bang, Gyeonggi-do (KR); Seung-Il Myong, Daejeon-si (KR); Seung-Hyun Cho, Daejeon-si (KR); Jie-Hyun Lee, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 135 days.

(21) Appl. No.: 14/082,902

(22) Filed: Nov. 18, 2013

(65) Prior Publication Data

US 2014/0219659 A1 Aug. 7, 2014

(30) Foreign Application Priority Data

Feb. 4, 2013 (KR) ........................ 10-2013-0012572

(51) Int. Cl.
*H04J 14/02* (2006.01)
*H04L 27/26* (2006.01)
*H04L 5/00* (2006.01)
*H04Q 11/00* (2006.01)

(52) U.S. Cl.
CPC .......... *H04L 27/2608* (2013.01); *H04L 5/0039* (2013.01); *H04L 5/0064* (2013.01); *H04L 27/2697* (2013.01); *H04Q 11/0067* (2013.01); *H04L 5/0053* (2013.01)

(58) Field of Classification Search
None
See application file for complete search history.

(56) References Cited

U.S. PATENT DOCUMENTS

| 8,000,604 | B2 | 8/2011 | Qian et al. | |
| 2006/0268704 | A1* | 11/2006 | Ansari et al. | 370/230 |
| 2008/0267630 | A1* | 10/2008 | Qian et al. | 398/89 |
| 2010/0054735 | A1 | 3/2010 | Wei et al. | |

OTHER PUBLICATIONS

Jingjing Zhang et al., "An Efficient MAC Protocol for Asynchronous ONUs in OFDMA PONs" Optical Fiber Communication Conference and Exposition (OFC/NFOEC), 2011 and the National Fiber Optic Engineers Conference, pp. 1-3, Mar. 6-10, 2011.
Konstantinos Kanonakis et al., "Physical-Layer-Aware MAC Schemes for Dynamic Subcarrier Assignment in OFDMA-PON" Journal of Lightwave Technology, vol. 30, Issue 12, pp. 1915-1923, Jun. 15, 2012.

* cited by examiner

*Primary Examiner* — Darren E Wolf
(74) *Attorney, Agent, or Firm* — Rabin & Berdo, P.C.

(57) ABSTRACT

There are provided a method of allocating upstream bandwidth resources and a method of transmitting upstream data in an orthogonal frequency division multiple access-open optical subscriber network. The method of allocating an upstream bandwidth resource according to an embodiment of the invention includes receiving queue status information from each optical network unit (ONU), and allocating an upstream bandwidth by providing to each ONU a 2-D upstream bandwidth map on a subcarrier-time resource through a frame synchronized at constant cycles, based on the queue status information received from each ONU.

14 Claims, 10 Drawing Sheets

SERVICES IN WHICH
DELAY IS NOT GUARANTEED

METHOD OF ALLOCATING UPSTREAM BANDWIDTH RESOURCE AND METHOD OF TRANSMITTING UPSTREAM DATA IN ORTHOGONAL FREQUENCY DIVISION MULTIPLE ACCESS-OPEN OPTICAL SUBSCRIBER NETWORK

CROSS-REFERENCE TO RELATED APPLICATION

This application claims priority from Korean Patent Application No. 10-2013-0012572, filed on Feb. 4, 2013, in the Korean Intellectual Property Office, the entire disclosure of which is incorporated herein by reference for all purposes.

BACKGROUND

1. Field

The following description relates to orthogonal frequency division multiple access-open optical subscriber network technology, and more particularly, to upstream bandwidth resource allocation in an orthogonal frequency division multiple access-open optical subscriber network is and upstream access technology for the same.

2. Description of the Related Art

Orthogonal frequency division multiplexing (hereinafter referred to as 'OFDM') technology is transmission technology widely used in mobile communications. Since data is transmitted over a plurality of low-speed orthogonal subcarriers, it is possible to overcome a transmission limitation of transmission media and transmit data at high speed.

Orthogonal frequency division multiple access-passive optical network (OFDMA-PON) technology adopts an OFDM method in a passive optical network (PON), and is a type of next-generation passive optical subscriber network technology that requires high-speed data transmission and long-distance transmission.

SUMMARY

The following description relates to a method of dynamically allocating a subcarrier-time resource to each ONU that is easily implemented, provides fair differentiated service between ONUs, and provides high bandwidth utilization using a 2-D subcarrier-time resource based on a synchronized frame structure, when an upstream bandwidth is allocated in order to multiplex a plurality of optical network units (hereinafter referred to as 'ONUs') in an OFDMA-PON system.

In one general aspect, there is provided a method of allocating an upstream bandwidth resource of an optical line terminal in an orthogonal frequency division multiple access-open optical subscriber network. The method includes receiving queue status information from each optical network unit (ONU), and allocating an upstream bandwidth by providing to each ONU a 2-D upstream bandwidth map on a subcarrier-time resource through a frame synchronized at constant cycles, based on the queue status information received from each ONU.

In the allocating of the upstream bandwidth, for each service of the ONU, allocation bytes during a corresponding service interval may be calculated according to a service interval composed in units of at least one frame, and the 2-D upstream bandwidth map, in which the calculated allocation bytes are allocated to a corresponding service class, may be created.

In the allocating of the upstream bandwidth, the upstream bandwidth may be allocated in units of subcarriers of a frame synchronized with each subscriber device. When the upstream bandwidth is allocated in units of subcarriers, a remaining space of subcarriers, a negative offset, may be firstly filled for delay-sensitive service classes, and the subcarriers may be additionally filled. Otherwise, when the upstream bandwidth is allocated in units of subcarriers, the negative offset may be firstly filled for delay-insensitive service classes, the subcarriers may be additionally filled, and then a remaining positive offset that is not filled may be redistributed. In this case, the remaining positive offset may be redistributed using, for example, a round-robin method or a weight method.

The allocating of the upstream bandwidth may include, for a service class of each ONU, calculating an available bandwidth for the corresponding service class, and allocating the calculated available bandwidth to the corresponding service class of the corresponding ONU.

In the calculating of the available bytes, the available bytes may be set as a minimum value among the allocation bytes that is requested for the corresponding service class of the corresponding ONU, available bytes at a current time, a allocation amount limit during a service interval, and an allocation amount limit for the corresponding service class of the corresponding ONU. In this case, currently available bytes may be calculated using the number of currently available subcarriers, a number of bytes provided in one subcarrier, and modulation format is information.

In the allocating of the upstream bandwidth, in order to guarantee a time for subcarrier switching of a corresponding ONU and distinguish a boundary between frames, a frame guard time may be set therebetween, the 2-D upstream bandwidth map may be inserted into a synchronized frame, and then the synchronized frame may be provided to the corresponding ONU.

In another aspect, there is provided a method of transmitting upstream data of an ONU in an orthogonal frequency division multiple access-open optical subscriber network. The method includes transmitting queue status information to an optical line terminal, when the optical line terminal creates a 2-D upstream bandwidth map on a subcarrier-time resource based on a frame synchronized at constant cycles according to the queue status information, receiving the frame including the 2-D upstream bandwidth map from the ONU, and transmitting the upstream data using the received 2-D upstream bandwidth map to the optical line terminal.

In the transmitting of the upstream data to the optical line terminal, the upstream data may be transmitted to the optical line terminal according to a priority of a service class, using the number of subcarriers allocated through the received 2-D upstream bandwidth map. The number of subcarriers allocated to a predetermined service class may be determined using allocation bytes to the service class, a number of bytes provided in one subcarrier, and modulation format information.

Other features and aspects will be apparent from the following detailed description, the drawings, and the claims.

Throughout the drawings and the detailed description, unless otherwise described, the is same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

Figure 1:
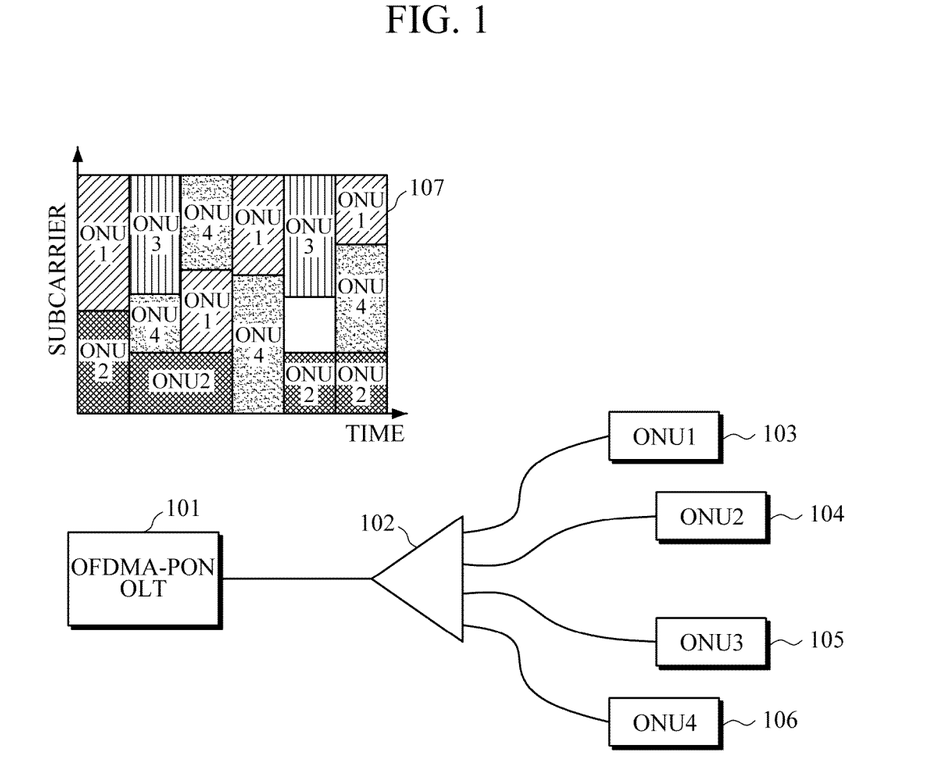
FIG. 1 is a diagram illustrating a configuration of an OFDMA-PON according to the is invention.

Hereinafter, in order to facilitate understanding and reproduce by those skilled in the art, the present invention will be described in detail by explaining exemplary embodiments with reference to the accompanying drawings. When it is determined that detailed explanations of related well-known functions or configurations unnecessarily obscure gist of the embodiments, the detailed description thereof will not be repeated. The terminology used herein is defined by considering a function in the embodiments, and meanings may vary depending on, for example, a user or operator's intentions or customs. Therefore, the meanings of terms used in the embodiments should be interpreted based on the scope throughout this specification. FIG. 1 is a diagram illustrating a configuration of an orthogonal frequency division multiple access-passive optical network (hereinafter referred to as an 'OFDMA-PON') according to the invention.

As illustrated in FIG. 1, an overall network topology of the OFDMA-PON is similar to a time division multiplexing passive optical network (hereinafter referred to as a 'TDM-PON'). In order to transmit upstream data to an optical line terminal (hereinafter referred to as an 'OLT') 101, optical network units (hereinafter referred to as an 'ONU') 103, 104, 105, and 106 is respectively use a subcarrier-time resource allocated by the OLT 101, indicated by reference numeral 107 in FIG. 1.

Since the PON has a structure in which a plurality of ONUs are connected to one OLT, the PON system needs control and management including resource allocation for improving network performance and utilization in addition to fair access multiplex and differentiated services for the plurality of ONUs.

Figure 2:
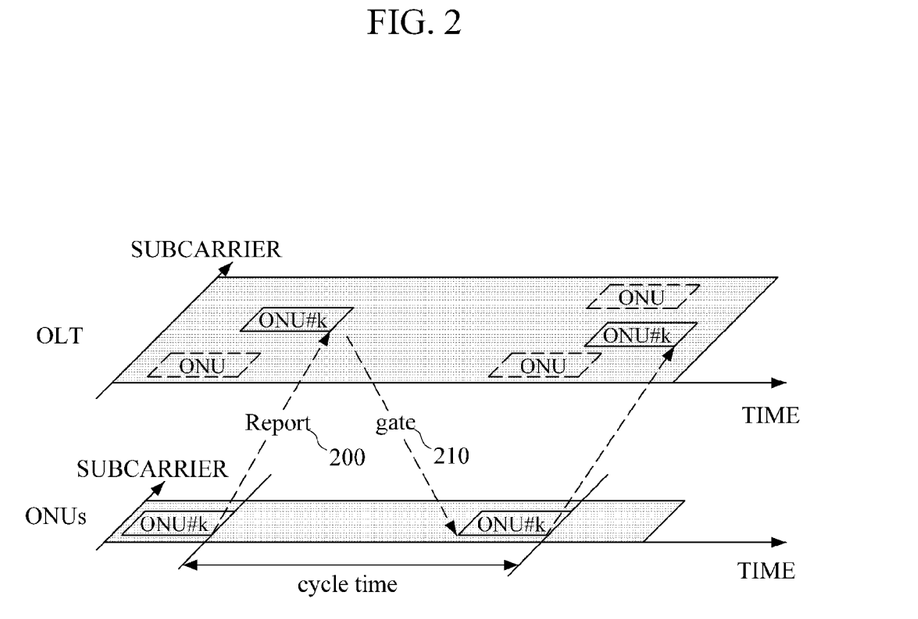
FIG. 2 is an exemplary diagram illustrating a general control message transmission process between an OLT and an ONU to allocate an upstream bandwidth.

FIG. 2 is an exemplary diagram illustrating a general control message transmission process between the OLT and the ONU to allocate an upstream bandwidth.

Since the TDM-PON uses a time division multiplex method, it uses a multiplex method in which a unique time slot is allocated to each ONU. On the other hand, the OFDMA-PON uses a method in which the bandwidth is two dimensionally allocated to each ONU using two resources: time and subcarriers.

Examples of 2-D allocation (time and subcarrier) of the upstream bandwidth of the OFDMA-PON include a report/gate type dynamic subcarrier allocation method that is a 2-D extension of a report/gate type 10 G-Ethernet PON (EPON) Medium Access Control (MAC).

More specifically, as illustrated in FIG. 2, in a report/gate mechanism of the OFDMA-PON MAC, each ONU requests upstream bandwidth allocation to the OLT through a report message 200. Then, the OLT allocates an upstream bandwidth resource to each ONU using a subcarrier-time resource through a gate message 210.

Since resources that can be used by the ONU are subcarriers and time, the OLT allocates a subcarrier range and a time domain to be used by the ONU in the form of a 2-D square in order to allocate the upstream bandwidth resource. Since the report/gate mechanism is performed in units of packets, whenever a report message is received from an arbitrary ONU, the OLT searches all subcarriers and finds the most appropriate square (subcarrier and time) in order to maximize upstream bandwidth utilization and minimize a service delay. In this way, since it is necessary to find the most appropriate square by considering various services and fairness between ONUs whenever each packet is received, a complex algorithm and a hardware to process the complex algorithm at high speed are required. Moreover, since subcarriers allocated in each ONU need to be rapidly switched in units of packets in order to improve the upstream network utilization, each ONU needs a high-speed subcarrier switching function.

Accordingly, in order to address the above-described problems, the invention proposes a method of dynamically allocating an upstream bandwidth according to queue status information of ONUs based on a synchronized frame structure in the OFDMA-PON. Here, the synchronized frame structure is a structure capable of transmitting data using the same frame length with a synchronized transmission method, and resources are allocated based on an appropriate frame interval in order to transmit the data. The synchronized frame structure will be described below with reference to FIGS. 3 and 4. The queue status information of the ONUs may be status information of transmission containers to transmit upstream data to the OLT after the ONUs store the upstream data for each service class to accommodate a variety of traffic. The OLT collects a plurality of pieces of queue status information and allocates the upstream bandwidth based on the queue status information.

According to the invention, in order to allocate the upstream bandwidth in the OFDMA-PON, the queue status information of the ONUs is reported to the OLT, the OLT informs each ONU of the upstream bandwidth in a 2-D bandwidth map (BWmap) on a subcarrier range and a time domain based on queue status information of the ONUs, and gates upstream data transmission of the ONUs.

Figure 5A:
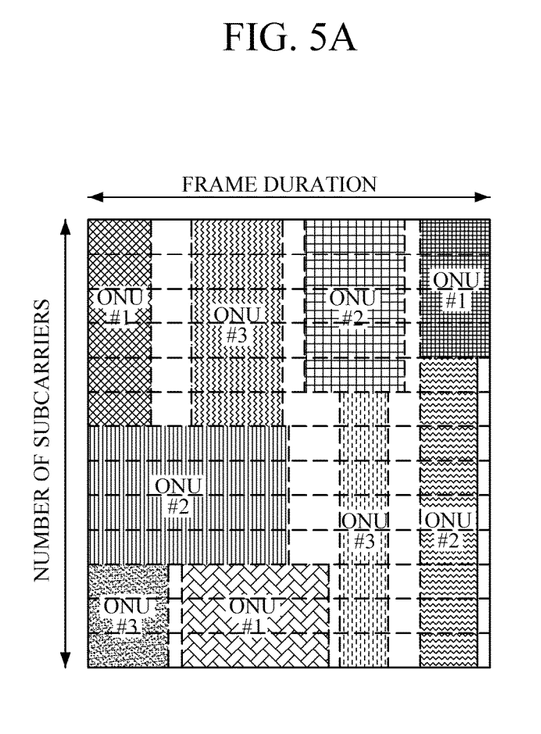
FIG. 5A is a diagram illustrating a structure of a frame when an upstream bandwidth resource is allocated in two dimensions (subcarrier and time) according to service classes of ONUs.
Figure 5B:
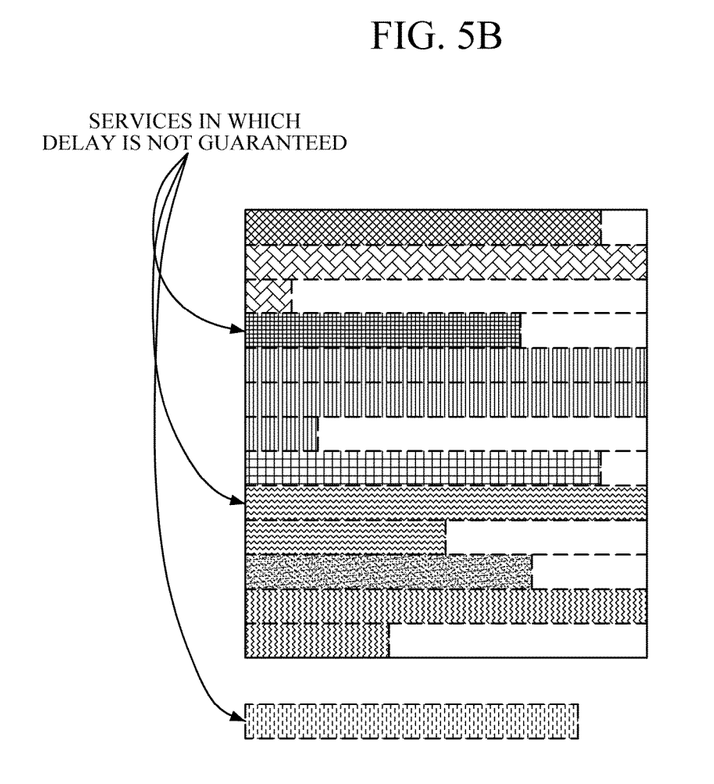
FIG. 5B is a diagram illustrating a structure of a frame when the upstream bandwidth resource is allocated in units of subcarriers of a frame.
Figure 5C:
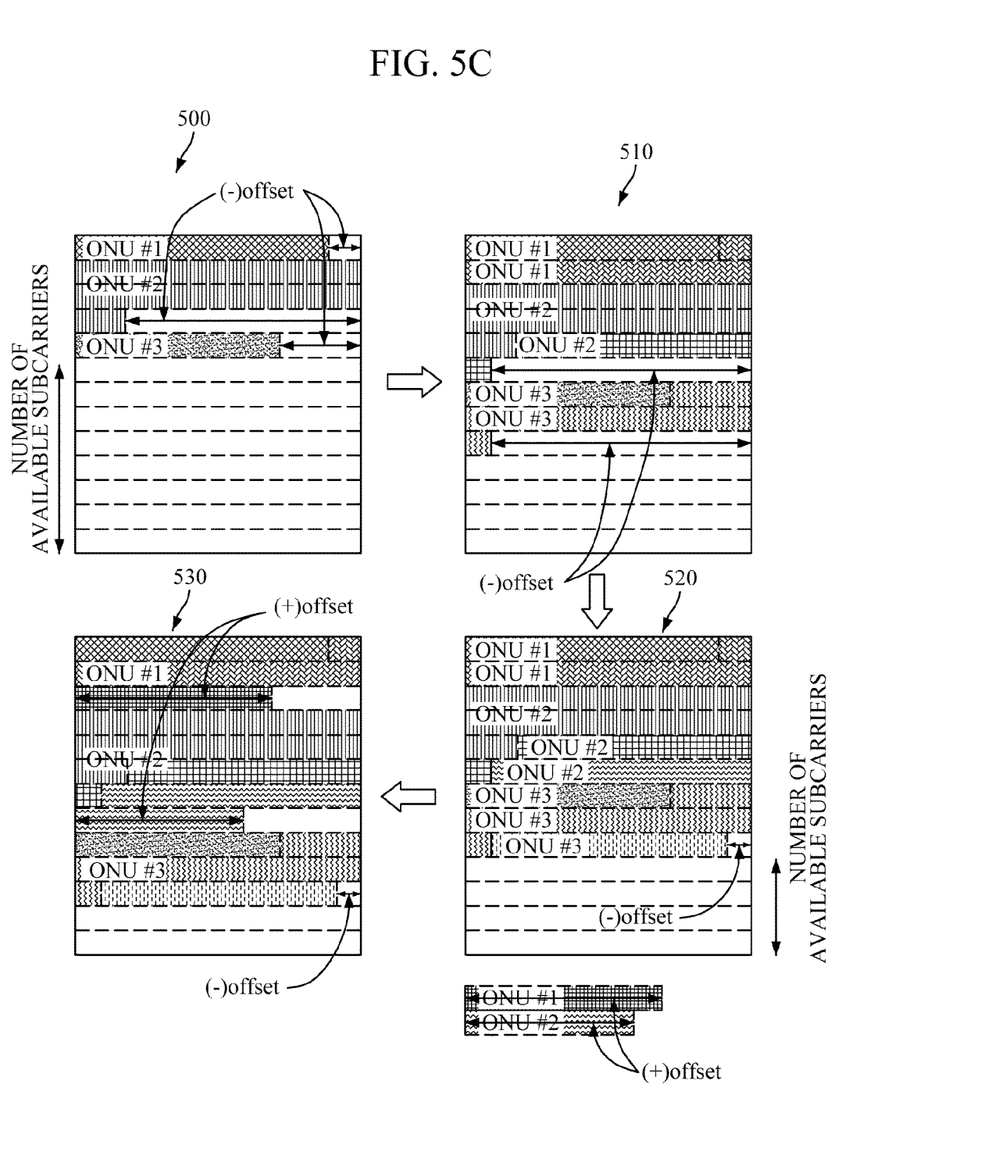
FIG. 5C is a reference diagram illustrating a method of efficiently and sequentially allocating the resource using a (+/−) offset method according to the embodiment of the invention.

More specifically, in the OFDMA-PON that supports adaptive modulation depending on a physical channel status, in order to support a differentiated service according to service requirements in terms of, for example, throughput, delay, or jitter, the invention defines allocation bytes based on a service interval in units of frames per service and allocates the upstream bandwidth. In addition, the invention allocates the upstream bandwidth in units of subcarriers of a frame. Moreover, in order to improve the bandwidth utilization of the ONU, the invention uses a +/− offset method according to a service class. The +/− offset method will be described below with reference to FIG. 5.

Figure 3:
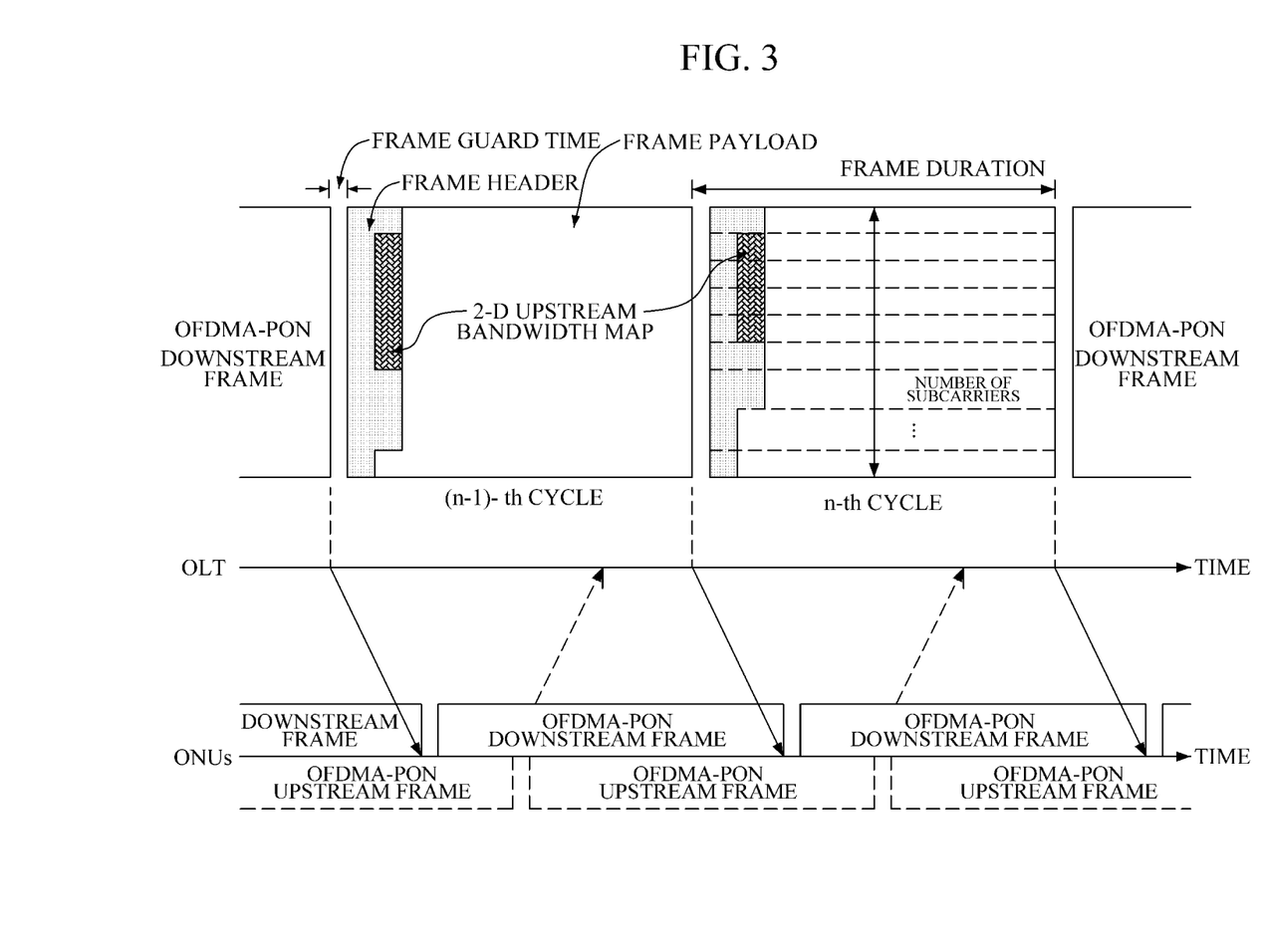
FIG. 3 is a diagram illustrating a structure of a downstream frame that uses a report/gate process of the OFDMA-PON using a synchronized frame structure according to an embodiment of the invention.
Figure 4:
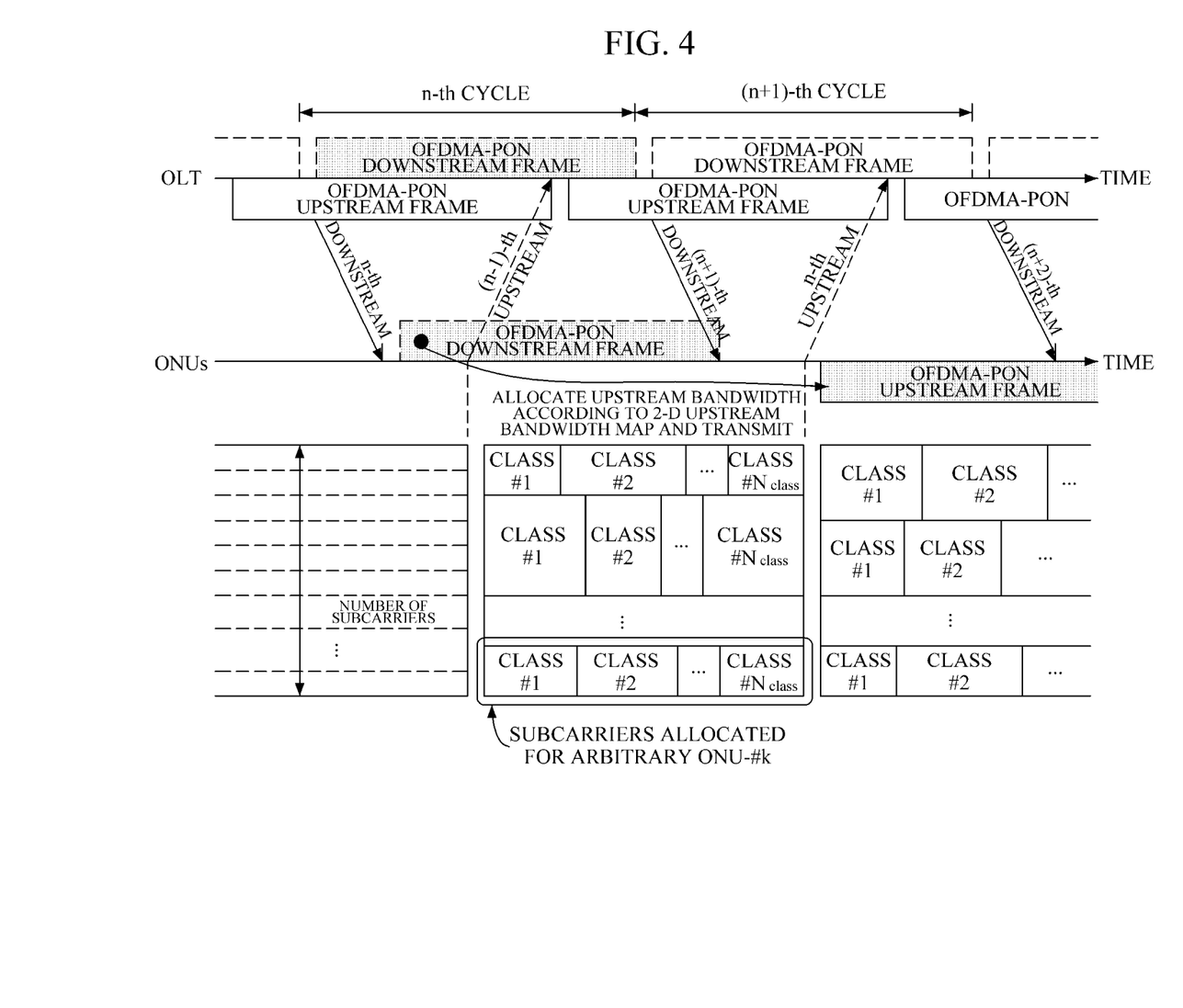
FIG. 4 is a diagram illustrating a structure of an upstream frame that uses the report/gate process of the OFDMA-PON using the synchronized frame structure according to the embodiment of the invention.

FIGS. 3 and 4 illustrate a report/gate process of the OFDMA-PON using the synchronized frame structure according to the embodiment of the invention. FIG. 3 illustrates a structure of a downstream frame and FIG. 4 illustrates a structure of an upstream frame.

As illustrated in FIGS. 3 and 4, the upstream frame and the downstream frame are repeatedly transmitted at fixed cycles. In FIG. 3, in order to guarantee a time for subcarrier switching and distinguish a boundary between frames, each OFDMA-PON downstream frame has a guard time therebetween and is used to deliver a 2-D upstream bandwidth map and data.

FIG. 4 specifically illustrates a structure of the upstream frame of the OFDMA-PON when the upstream bandwidth is allocated in units of subcarriers. As illustrated in FIG. 4, each ONU receives a 2-D upstream bandwidth map of an n-th cycle of a downstream frame from the OLT. Then, based on the received 2-D upstream bandwidth map, each ONU transmits the upstream data frame to the OLT according to a priority of a service class, using the number of allocated subcarriers.

Meanwhile, the OFDMA-PON of the invention may support adaptive modulation of each subcarrier depending on a physical channel status. The adaptive modulation is technology that changes a network system parameter, for example, a modulation format, depending on the channel status so that it has maximum transmission performance while satisfying an allowable bit error rate (BER) in a transmission distance.

While each subcarrier can use different modulation formats, it is assumed that subcarriers allocated to each ONU use the same modulation format, in order to simplify explanation of a dynamic subcarrier allocation method of the invention. A transmission rate per modulator is compared when a high modulation format is used in a physical channel, which results in 10 Gbits/s when BPSK is used, 20 Gbits/s when 4QAM is used, and 40 Gbits/s when 16QAM is used. That is, the transmission rate increases by a multiple of log 2 (modulation level).

According to the invention, the OFDMA-PON having the synchronized frame structure simplifies an upstream bandwidth distribution problem between ONUs to a resource distribution problem in a frame. However, allocating the upstream bandwidth resource by considering each service class of all ONUs in one frame may cause performance degradation in terms of service differentiation and difficulties in implementation. Services in the network have different performance requirements. Services, for example, a voice call or a video conference, are sensitive to delay. However, in services, for example, an Internet service or a file transfer service, a transmission rate and an amount of transmission are more important than delay. Therefore, delay-insensitive services may utilize an idle resource when the idle resource is present in the upstream bandwidth.

In resource distribution, when the resource is equally allocated to all ONUs in units of frames, network throughput decreases due to overhead generated in each ONU and an amount of computation increases in order to fairly or efficiently distribute the upstream bandwidth resource between services of all ONUs for each frame.

In order to address the above-described problems, the invention provides a simple method to implement a convenient system and to provide differentiated services. That is, allocation bytes (AB) according to a service interval (SI) in units of frames per service class are is defined and utilized. Hereinafter, embodiments of the method will be described.

A service rate (SR) of service class-#j of ONU-#k is expressed as Formula 1, where a service interval for service class-#j of ONU-#k is SI[j][k] and allocation bytes according to the service interval are AB[j][k].

$$SR[j][k]=AB[j][k]/(SI[j][k]*T\text{frame}) \quad \text{Formula 1}$$

In Formula 1, Tframe represents frame duration. For example, allocation bytes are 20 Kbytes for a service (delay insensitive) with a service interval of 16, and 5 Kbytes for a service (delay sensitive) with a service interval of 4, when a service rate is 80 Mbits/s and Tframe is 125 us. The allocation bytes do not mean the maximum amount that can be reported from each ONU.

Definitions of the service interval and the allocation bytes during the service interval may be directly used as an estimated value to allocate the upstream bandwidth for each service class of ONUs in the OFDMA-PON based on the synchronized frame.

According to the embodiment, the service interval and its allocation bytes may be used with a service interval timer (SI_timer). When services of ONUs capable of having different service intervals are used with the SI_timer, although services of the ONUs are provided by allocating the upstream bandwidth resource at different time points, fairness between ONUs during an interval of several frames is provided. For example, the timer may be utilized as in the following example.

The following code is an embodiment of a method in which the SI_timer per service class of all ONUs is operated, and represents a method of calculating allocation bytes for service class-#j of ONU-#k.

```
// Sample code-#1
while( ) {
do_assign(assigned_bytes[j][k]);
if (SI_timer[j][k] == 1) {
        SI_timer[j][k] = SI[j][k];
        alloc_limit[j][k] = AB[j][k];
} else {
    SI_timer[j][k]--;
}
}
```

In Sample code-#1, assigned_bytes[j][k] represents available bytes calculated for a selected service class of a selected ONU. assigned_bytes are allocated to service class-#j of ONU-#k by executing the do_assign(assigned_bytes[j][k]) function. SI[j][k] represents a service interval for service class-#j of ONU-#k and AB[j][k] represents the allocation bytes thereof. SI_timer[j][k] represents a service interval timer, and the above embodiment uses a decreasing timer. alloc_limit[j][k] represents an allocation amount limit during the service interval, decreases by an amount allocated for each frame, and is initialized at each service interval by AB[j]

[k]. This parameter is used to prevent performance degradation of other ONUs due to bandwidth monopoly of a specific ONU.

There are a variety of methods of calculating assigned_bytes[j][k] depending on systems. According to an embodiment, assigned_bytes may be calculated by the following Formula 2 using a greedy allocation method, where an amount requested from service class-#j of ONU-#k is request [j][k], and available_bytes are available bytes at that time.

$$\text{assigned\_bytes}[j][k] = \text{MIN}(\text{request}[j][k], \text{alloc\_limit}[j][k], \text{available bytes}) \quad \text{Formula 2}$$

According to another embodiment, assigned_bytes may be calculated by the following Formula 3 when an allocation limit (alloc_limit_frame[j][k]) for service class-#j of ONU-#k in one frame needs to be set.

$$\text{assigned\_bytes}[j][k] = \min(\text{request}[j][k], \text{alloc\_limit}[j][k], \text{alloc\_limit\_frame}[j][k], \text{available bytes}) \quad \text{Formula 3}$$

According to the invention, since the adaptive modulation for subcarriers is considered in the OFDMA-PON, available_bytes at a specific point of time can be represented in terms of the number of currently available subcarriers (N_sc_rem), a predetermined modulation method, for example, a number of bytes provided in one subcarrier (sc_bytes) in a biphase shift keying (BPSK) method, and modulation format information (mod [j][k]), as shown in Formula 4.

$$\text{available\_bytes} = N\_sc\_rem * sc\_bytes * \text{mod}[j][k] \quad \text{Formula 4}$$

With reference to Sample code-#1, assigned_bytes calculated using the allocation process is allocated to service class-#j of ONU-#k through a do_assign(assigned_bytes[j][k]) function.

When the upstream bandwidth resource is allocated in units of subcarriers of a frame in order to simplify a system configuration, it is necessary for ONUs to provide information about the number of subcarriers to be used. The number of subcarriers allocated to service class-#j of ONU-#k may be calculated by Formula 5 or 6 depending on system operation purposes.

$$\text{needed\_sc}[j][k] = \text{ceil}((\text{assigned\_bytes}[j][k])/(sc\_bytes * \text{mod}[k])) \quad \text{Formula 5}$$

$$\text{needed\_sc}[j][k] = \text{floor}((\text{assigned\_bytes}[j][k])/(sc\_bytes * \text{mod}[k])) \quad \text{Formula 6}$$

In Formulas 5 and 6, a ceil function returns the smallest integer value that is greater than or equal to a number, for example, ceil (2.3)=3, ceil(3)=3, and ceil (3.2)=4. On the other hand, a floor function returns the largest integer value that is equal to or less than a number, for example, floor (2.3)=2, floor(3)=3, and floor(3.2)=3.

In Formulas 5 and 6, needed_sc[j][k] is the number of subcarriers allocated to service class-#j of ONU-#k. An expression for the number of allocated subcarriers may be modified depending on purposes.

The number of subcarriers allocated to ONU-#k for total service classes is given below.

```
for(int j=0; j<N_class; j++) {
    assigned_sc[k] = assigned_sc[k] + needed_sc[j][k];
},
``` where N_class is the number of total service classes.

As described above, when the OLT allocates the upstream bandwidth resource in units of subcarriers of a frame, assigned_bytes[j][k] needs to be sufficiently distributed in units of subcarriers according to a further complicated expression. Otherwise, the upstream bandwidth utilization may be decreased.

Since system implementation may be difficult due to an expression with a complicated algorithm, the invention uses a simple method in which a (+/−) offset is applied in order to improve the upstream bandwidth utilization. To describe the method in which the (+/−) offset is applied, it is assumed that three ONUs are present and each ONU has three service classes, where two service classes are delay sensitive and the other one is delay insensitive. The method of applying the (+/−) offset of the invention will be described with reference to FIGS. 5A to 5C.

FIG. 5A is a diagram illustrating a structure of the frame when the upstream bandwidth resource is allocated in two dimensions (subcarrier and time) according to service classes of the ONUs.

When the upstream bandwidth is separately allocated per service class of each ONU in order to satisfy a performance requirement of each service of the ONUs, each ONU may use an available OFDM inverse fast Fourier transform (IFFT)/fast Fourier transform (FFT) block as much as possible in order to transmit corresponding service class data upstream. However, when the limited number of OFDM IFFT/FFT blocks is forced to be used, as illustrated in FIG. 5A, there is a waste of space in allocation and calculation using a complex algorithm is required in an allocation process.

FIG. 5B is a diagram illustrating a structure of the frame when the upstream bandwidth resource is allocated to each subcarrier of the frame.

As illustrated in FIG. 5B, when the upstream bandwidth resource is allocated in units of subcarriers of a frame, more resource is wasted than in the method in FIG. 5A, and service classes that are not provided may occur.

FIG. 5C is a reference diagram illustrating a method of efficiently and sequentially allocating the resource using the (+/−) offset method according to the embodiment of the invention.

As illustrated in FIG. 5C, for first delay-sensitive services, indicated by reference numeral 500, the upstream bandwidth is allocated to subcarriers in the required allocation bytes. Then, the remaining space of subcarriers is stored as a (−) offset (negative offset) value.

Next, when the upstream bandwidth is allocated for second delay-sensitive services, indicated by reference numeral 510, a (−) offset is used to allocate the bandwidth for the other services belonging to the same ONU. In this case, an empty portion the size of the (−) offset is filled and additionally required subcarriers are allocated.

Next, for third delay-insensitive services, indicated by reference numeral 520, an empty portion the size of the (−) offset is firstly filled and additionally required subcarriers are allocated. However, these services are allowed to be provided for a long time. Therefore, when the number of available subcarriers is insufficient and it is difficult to additionally allocate them, the unfilled subcarriers are processed as a (+) offset (positive offset) and are accumulated for several frames, as indicated by reference numeral 530. Thus, it is possible to prevent a decrease in upstream bandwidth utilization due to unused spaces of bytes allocated when the (+) offset does not occur.

When there is a remaining subcarrier even after the upstream resource is allocated to service classes of all ONUs, the subcarrier may be firstly distributed and allocated to the ONUs having the (+) offset. There are no limitations on a policy of distributing the remaining subcarriers.

The above-described (+/−) offset method may be linked with the ceil or floor function in calculating of the number of subcarriers allocated to service class-#j of ONU-#k described above. In FIG. 5C, there are additionally available subcarriers while a required amount of service classes of all ONUs is satisfied. The remaining subcarriers may be redistributed using, for example, a round-robin method or a weight method.

Figure 6:
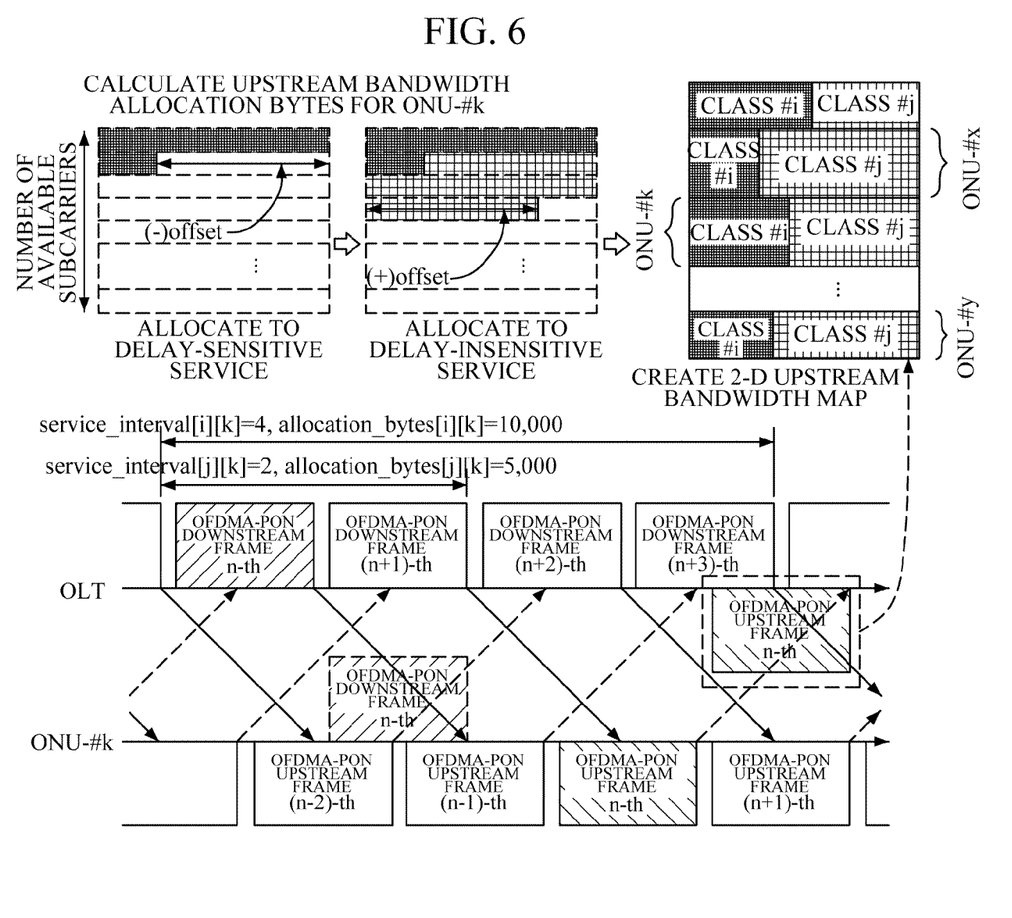
FIG. 6 is a diagram illustrating a process of calculating upstream bandwidth allocation bytes for the ONU according to the embodiment of the invention.

When the upstream bandwidth resource is allocated to subcarriers in units of subcarriers of a frame by combining the above-described contents, it is represented as FIG. 6.

FIG. 6 is a diagram illustrating a process of calculating upstream bandwidth allocation bytes for the ONU according to the embodiment of the invention.

As illustrated in FIG. 6, based on the OFDMA-PON having the synchronized frame structure, subcarriers are dynamically allocated to N ONUs including N service classes that can be classified as delay-sensitive or delay-insensitive. When a strict or bounded delay is required, it is defined as a delay-sensitive service (for example, a CBR (voice call) or VBR (video) type service). On the other hand, when a delay is not guaranteed, it is defined as a delay-insensitive service (for example, Best Effort type service). It is assumed that the same modulation method is used in the ONU.

As illustrated in FIG. 6, the OLT calculates the upstream bandwidth allocation bytes for ONU-#k. In this case, services are divided into delay-sensitive services and delay-insensitive services, and the upstream bandwidth is sequentially allocated to each service using the (+/−) offset method described in FIG. 5C.

The embodiment of the method of allocating subcarriers to the delay-sensitive services and delay-insensitive services will be described below with reference to FIGS. 7 and 8, respectively. Moreover, a partial use and a different arrangement of content features described above may also be possible.

Figure 7:
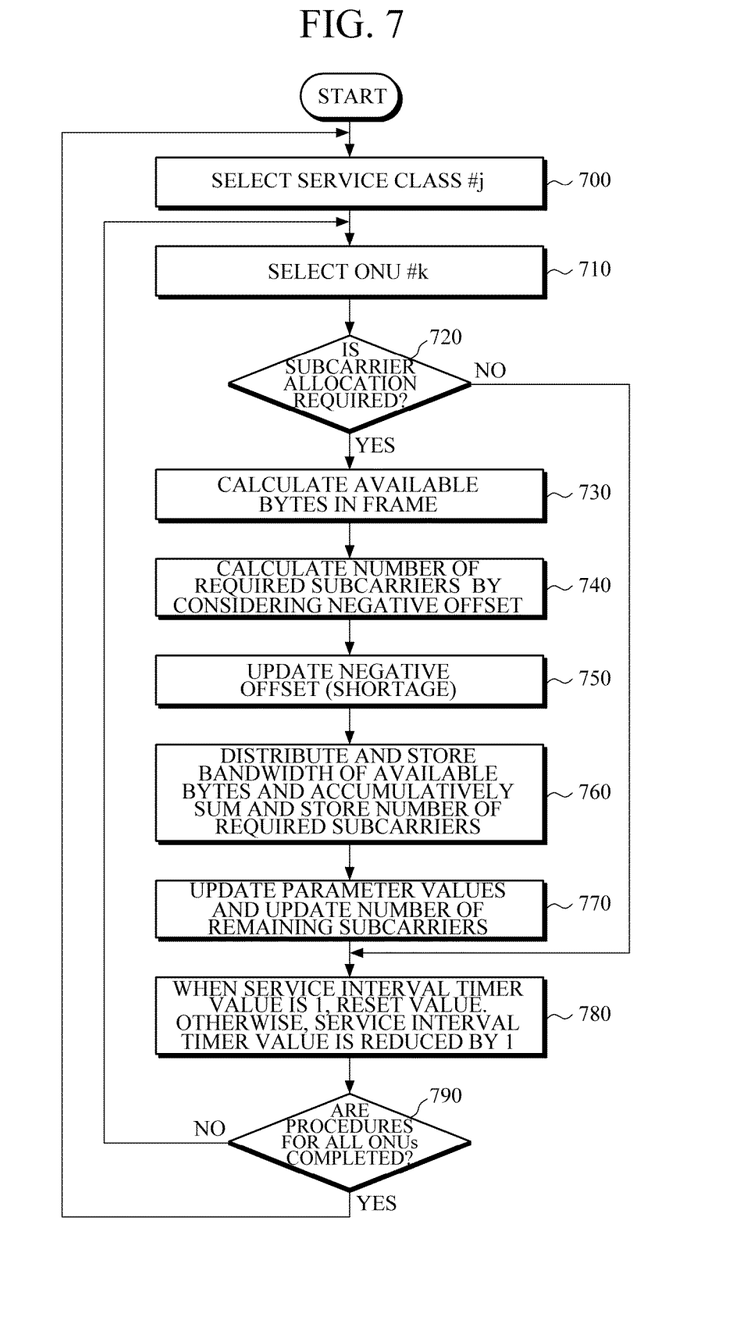
FIG. 7 is a flowchart illustrating a method of allocating subcarriers to delay-sensitive services according to the embodiment of the invention.

FIG. 7 is a flowchart illustrating the method of allocating subcarriers to the delay-sensitive services according to the embodiment of the invention.

As illustrated in FIG. 7, the OLT selects service class-#j and ONU-#k (700 and 710). Next, it is determined whether subcarrier allocation is required (720), and when it is required, available bytes in the frame are calculated (730). Then, the number of required subcarriers is calculated by considering a (−) offset (740) and the (−) offset is updated (750).

Next, the bandwidth of the available bytes is distributed and stored, and the number of required subcarriers is accumulatively summed and stored (760). Then, parameter values are updated and the number of remaining subcarriers is updated (770). Next, after a service interval timer value is checked, when the value is 1, the value is reset. Otherwise, the service interval timer value is reduced by 1 (780), and then the above-described procedures are repeated for all ONUs and all service classes (790).

Figure 8:
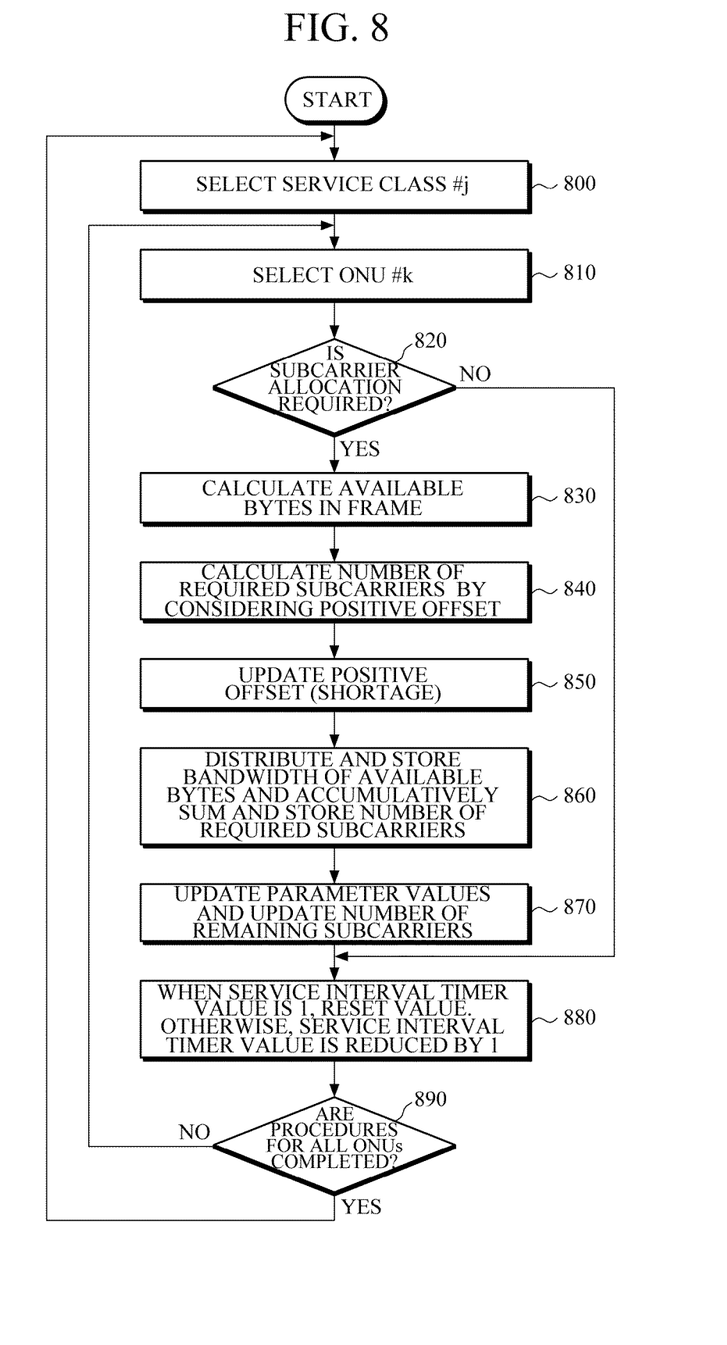
FIG. 8 is a flowchart illustrating a method of allocating subcarriers to delay-insensitive services according to the embodiment of the invention.

FIG. 8 is a flowchart illustrating the method of allocating subcarriers to the delay-insensitive services according to the embodiment of the invention.

As illustrated in FIG. 8, the OLT selects service class-#j and ONU-#k (800 and 810). Next, it is determined whether subcarrier allocation is required (820), and when it is required, is available bytes in the frame are calculated (830). Then, the number of required subcarriers is calculated by considering a (+) offset (840), and the (+) offset is updated (850).

Next, the bandwidth of the available bytes is distributed and stored, and the number of required subcarriers is accumulatively summed and stored (860). Then, parameter values are updated and the number of remaining subcarriers is updated (870). Next, after a service interval timer value is checked, when the value is 1, the value is reset, otherwise, the service interval timer value is reduced by 1 (880), and then the above-described procedures are repeated for all ONUs and all service classes (890).

While the present invention has been particularly described with reference to exemplary embodiments, it will be understood by those of skilled in art that various changes in form and details may be made without departing from the spirit and scope of the present invention. Therefore, the exemplary embodiments should be considered in a descriptive sense only and not for purposes of limitation. The scope of the invention is defined not by the detailed description of the invention but by the appended claims, and encompasses all modifications and equivalents that fall within the scope of the appended claims.

When square-based 2-D resource allocation is performed using an existing report/gate mechanism, a hardware configuration capable of processing a large number of calculations in a short time in order to find an appropriate square is required. Also, an ONU subcarrier tuning system, which has a short subcarrier switching time in order to improve network utilization in upstream transmission, is required. Furthermore, a complex algorithm is required to support differentiated services for guaranteeing real-time services and fairness between ONUs at all times.

On the other hand, when the synchronized frame structure of the invention is used, hardware system requirements are lowered and problems of service differentiation and fairness is are simplified to a problem of bandwidth allocation in a frame. However, it is complex to find an appropriate square in one frame to support each service class of all ONUs. Therefore, according to the invention, there is provided a method of creating a 2-D upstream bandwidth map on a subcarrier-time resource that uses a service interval and allocation bytes per service in order to support differentiated services.

In this way, the invention takes advantages of the frame structure so that it is possible to simplify a hardware configuration to obtain similar performance and fairness between ONUs, which is an important issue of a network.

In order to implement hardware of the invention, when the upstream bandwidth is distributed to ONUs in one frame, a method in which the upstream bandwidth is allocated on the 2-D upstream bandwidth map using a weight or greedy method is considered and adaptive modulation is considered in bandwidth allocation. Finally, it is important to use a +/− offset method in order to prevent a decrease in bandwidth utilization when the upstream bandwidth is allocated in units of subcarriers to simplify a system configuration.

The present invention can be implemented as computer-readable codes in a computer-readable recording medium. The computer-readable recording medium includes all types of recording media in which computer-readable data is stored. Examples of the computer-readable recording medium include a ROM, a RAM, a CD-ROM, a magnetic tape, a floppy disk, and an optical data storage. Further, the recording medium may be implemented in the form of carrier waves, such as those used in Internet transmission. In addition, the computer-readable recording medium may be distributed among computer systems over a network such that computer-readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of allocating an upstream bandwidth resource of an optical line terminal in an orthogonal frequency division multiple access-open optical subscriber network, the method comprising:

receiving queue status information from each optical network unit (ONU); and allocating an upstream bandwidth by providing to each ONU a 2-D upstream bandwidth map on a subcarrier-time resource through a frame synchronized at constant cycles, based on the queue status information received from each ONU;

wherein, in the allocating of the upstream bandwidth, first delay-sensitive services of an ONU are first allocated space in the 2-D upstream bandwidth map, and a remaining space of the 2-D upstream bandwidth map is designated as a negative offset, second delay-sensitive services of the ONU are next allocated space corresponding to the negative offset in the 2-D upstream bandwidth map, and delay-insensitive services of the ONU are last allocated space corresponding to the negative offset in the 2-D upstream bandwidth map, and if a number of subcarriers corresponding to space in the 2-D upstream bandwidth map is insufficient for the delay-insensitive services, unallocated space in the 2-D upstream bandwidth map is designated as a positive offset and accumulated for the delay-insensitive services over multiple frames.

2. The method of claim 1, wherein, in the allocating of the upstream bandwidth, for each service of the ONU, allocation bytes during a corresponding service interval are calculated according to a service interval composed in units of at least one frame, and the 2-D upstream bandwidth map, in which the calculated allocation bytes are allocated to a corresponding service class, is created.

3. The method of claim 1, wherein, in the allocating of the upstream bandwidth, the upstream bandwidth is allocated in units of subcarriers of a frame synchronized with each subscriber device.

4. The method of claim 3, wherein, in the allocating of the upstream bandwidth, the upstream bandwidth is allocated in units of subcarrier.

5. The method of claim 1, wherein a remaining positive offset that is not filled is redistributed.

6. The method of claim 1, wherein a remaining positive offset is redistributed using a round-robin method or a weight method.

7. The method of claim 1, wherein the allocating of the upstream bandwidth includes:

calculating an available bandwidth for a corresponding service class per service class of each ONU; and allocating the calculated available bandwidth to the corresponding service class of the corresponding ONU.

8. The method of claim 7, wherein, in the calculating of the available bandwidth, available bytes of the 2-D upstream bandwidth map are set as a minimum value among allocation bytes of the 2-D upstream bandwidth map requested for the corresponding service class of the corresponding ONU, available bytes of the 2-D upstream bandwidth map at a current time at which space in the 2-D upstream bandwidth is being allocated, an allocation amount limit on a service during a service interval, and an allocation amount limit for a service of the corresponding service class of the corresponding ONU.

9. The method of claim 8, wherein the available bytes are calculated using a number of currently available subcarriers, a number of bytes provided in one subcarrier, and modulation format information of a subcarrier.

10. The method of claim 1, wherein, in the allocating of the upstream bandwidth, in order to guarantee a time for subcarrier switching of a corresponding ONU and distinguish a boundary between frames, a frame guard time is set therebetween, the 2-D upstream bandwidth map is inserted into the synchronized frame, and then the synchronized frame is provided to the corresponding ONU.

11. The method of claim 1, further comprising:

selecting a service class; and selecting an ONU, wherein, in the allocating of the upstream bandwidth, the upstream bandwidth is allocated to the selected service class of the selected ONU.

12. A method of transmitting upstream data of an ONU in an orthogonal frequency division multiple access-open optical subscriber network, the method comprising:

transmitting queue status information to an optical line terminal;

when the optical line terminal creates a 2-D upstream bandwidth map on a subcarrier-time resource based on a frame synchronized at constant cycles according to the queue status information, receiving the frame including the 2-D upstream bandwidth map from the ONU; and transmitting upstream data using the received 2-D upstream bandwidth map to the optical line terminal;

wherein, in creating the 2-D upstream bandwidth map by the optical line terminal, first delay-sensitive services of the ONU are first allocated space in the 2-D upstream bandwidth map, and a remaining space of the 2-D upstream bandwidth map is designated as a negative offset, second delay-sensitive services of the ONU are next allocated space corresponding to the negative offset in the 2-D upstream bandwidth map, and delay-insensitive services of the ONU are last allocated space corresponding to the negative offset in the 2-D upstream bandwidth map, and if a number of subcarriers corresponding to space in the 2-D upstream bandwidth map is insufficient for the delay-insensitive services, unallocated space in the 2-D upstream bandwidth map is designated as a positive offset and accumulated for the delay-insensitive services over multiple frames.

13. The method of claim 12, wherein, in the transmitting of the upstream data to the optical line terminal, the upstream data is transmitted to the optical line terminal according to a priority of a service class, using a number of subcarriers allocated through the received 2-D upstream bandwidth map.

14. The method of claim 13, wherein, a number of subcarriers allocated to a service class is determined using allocation bytes allocated to the service class, a number of bytes provided in one subcarrier, and modulation format information of a subcarrier.

* * * * *